(12) United States Patent
Blackmore, Jr.

(10) Patent No.: US 9,265,201 B2
(45) Date of Patent: Feb. 23, 2016

(54) PLANT TRAY

(71) Applicant: Blackmore Company, Inc., Belleville, MI (US)

(72) Inventor: Fred N. Blackmore, Jr., Belleville, MI (US)

(73) Assignee: Blackmore Company, Inc., Belleville, MI (US)

( * ) Notice: Subject to any disclaimer, the term of this patent is extended or adjusted under 35 U.S.C. 154(b) by 106 days.

(21) Appl. No.: 13/888,934

(22) Filed: May 7, 2013

(65) Prior Publication Data

US 2014/0331554 A1 Nov. 13, 2014

(51) Int. Cl.
*A01G 9/02* (2006.01)
*A01G 9/10* (2006.01)

(52) U.S. Cl.
CPC ...................................... *A01G 9/104* (2013.01)

(58) Field of Classification Search
CPC ................................. A01G 9/10; A01G 9/104
USPC ............................................... 47/65.5, 73, 79
See application file for complete search history.

(56) References Cited

U.S. PATENT DOCUMENTS

| | | | | |
|---|---|---|---|---|
| 1,778,150 A * | 10/1930 | Freeburg | | 47/79 |
| 3,627,128 A * | 12/1971 | Ostrowsky | | 209/236 |
| 3,931,694 A * | 1/1976 | Krikorian | | 47/87 |
| 4,144,672 A * | 3/1979 | Gradwell et al. | | 47/73 |
| 4,242,834 A * | 1/1981 | Olsen | | 47/73 |
| 4,597,222 A * | 7/1986 | Roode | | 47/87 |
| 4,753,037 A * | 6/1988 | Whitcomb | | 47/73 |
| 5,339,566 A * | 8/1994 | Cormier | | 47/87 |
| 8,136,294 B2 * | 3/2012 | Wismans | | 47/66.7 |
| 2011/0258928 A1 * | 10/2011 | Adams | | A01G 27/04 47/79 |
| 2013/0160361 A1 * | 6/2013 | Keithly | | 47/66.7 |

* cited by examiner

*Primary Examiner* — Ebony Evans
(74) *Attorney, Agent, or Firm* — Harness, Dickey & Pierce, P.L.C.

(57) ABSTRACT

A horticulture tray including a growing cell. The growing cell includes a first end, a second end, a sidewall, and a plant supporting portion. The first end defines a first aperture having a first diameter. The second end is opposite the first end and has a second diameter that is smaller than the first diameter. The sidewall extends between the first end and the second end, and the sidewall continuously tapers from the first end to the second end. The plant supporting portion is proximate to the second end, but spaced apart from the second end. The plant supporting portion is configured to support a plant within the growing cell apart from the second end. The growing cell promotes proper root structure by supporting stabilized growth plugs therein without horizontal surfaces and by creating a perimeter gap such that air can circulate around the growth plugs to air prune roots.

9 Claims, 6 Drawing Sheets

PLANT TRAY

FIELD

The present disclosure relates to horticulture trays, for use with stabilized growing media.

BACKGROUND

This section provides background information related to the present disclosure which is not necessarily prior art.

Plants and trees require a branching and robust root structure to properly anchor them in the ground. Plants that do not have good root architecture, but rather have developed circular or spiral root structure, often referred to as girdling, may live for many years in the landscape before succumbing to the inherent problems caused by girdling. The economic damage caused by root system failure can be considerable.

Lack of proper root architecture or structure may lead to uprooting due to storms, wind, or even field saturation of the soil. Girdling can also lead to issues with mechanical harvesting (shaking) of nuts and fruits in commercial horticulture. Trees that fall over degrade the landscape, diminish the aesthetics of otherwise pleasant environments, cause property damage and utility outages. In commercial harvesting, where trees are often shaken to make ripened fruit or nuts drop, trees without proper root architecture may be damaged or even be pulled from the ground due to the shaking, resulting in crop and financial loss. Large trees are not easily replaced in the landscape and commercial fruit or nut bearing trees normally require many years to mature before harvesting is again possible.

The botanical term adventitious roots, is used to describe where mechanical pruning of a tap root forces lateral rooting. Field research has shown that air pruning promotes root architecture that is superior to mechanical pruning, particularly for species with a tap root.

Furthermore, many areas of the world where the need of reforestation is greatest also have limited water resources. Thus, water retention is an important design component of any production system that is to be viable in these regions.

Horticulture trays are often used to transport, store, and grow seeds and plants. Horticulture trays allow plants to be grown in ideal and protected conditions before being transported to their permanent locations. However, the confines of horticulture trays can often cause root girdling that affect the plants long after transplanting into the landscape. Thus there exists a need for horticulture trays that eliminate root girdling and promote proper root architecture.

Although there have been efforts to address the problems mentioned above, adequate solutions for providing the robust, lateral root architecture sought are not available. Existing production methods and containers fail to promote a generally linear root structure. A horticulture tray that can provide proper water management, active or passive, would also be desirable.

Prior horticulture trays are designed for use with loose fill growing media, such as loose soil, or soil-less mixes. These trays often attempt to mitigate girdling by including small holes in the sides or walls of the trays that allow roots that reach the holes to be air pruned. However, these holes can air prune only the roots that come in contact with them. Prior trays have also attempted to mitigate girdling by including vertical protrusions perpendicular to the sidewalls to prevent roots from following the sidewalls in a horizontal or circular direction. These vertical protrusions still fail to adequately prevent root girdling and promote proper root architecture by directing roots back toward the center of the tray causing a spiraling root structure.

Furthermore, stabilized growing media, sometimes referred to as stabilized growth plugs, or by trade name (such as Ellepots™ by The Blackmore Company), exist as a convenient, economical alternative to loose fill. Stabilized growth plugs can include soil, mulch, or peat moss wrapped in biodegradable paper, or can include other organic or synthetic substrate which retains its shape without a separate, supporting pot structure. These stabilized growth plugs can be planted directly into the ground making transplanting easier and more economical. As such, there exists a need for trays designed for growing and transporting plants in stabilized growth plugs which overcome the limitations of conventional loose fill trays while promoting proper root architecture and water retention.

SUMMARY

This section provides a general summary of the disclosure, and is not a comprehensive disclosure of its full scope or all of its features.

The present teachings provide for a horticulture tray comprising a growing cell. The growing cell includes a first end, a second end, a sidewall, and a plant supporting portion. The first end defines a first aperture having a first diameter. The second end is opposite the first end and has a second diameter that is smaller than the first diameter. The sidewall extends between the first end and the second end, and the sidewall continuously tapers from the first end to the second end. The plant supporting portion is proximate to the second end, but spaced apart from the second end. The plant supporting portion is configured to support a plant within the growing cell apart from the second end.

The present teachings also provide for a horticulture tray comprising a growing cell that includes a first end, a second end, a sidewall, a plant supporting portion, and a perimeter gap. The first end defines a first aperture having a first diameter. The second end is opposite the first end and has a second diameter that is smaller than the first diameter. The sidewall extends between the first end and the second end, and the sidewall continuously tapers from the first end to the second end. The sidewall includes a tapered first length and a tapered second length, the tapered second length is tapered more than the tapered first length. The plant supporting portion is proximate to the second end, but spaced apart from the second end at an interface between the tapered first and second lengths of the sidewall. The plant supporting portion is configured to support a stabilized growth plug within the growing cell spaced apart from the second end. The perimeter gap is defined between the stabilized growth plug and the sidewall. The perimeter gap is configured to promote uniform growth of a root system by air pruning.

The present teachings also provide for a horticulture tray comprising a growing cell that includes a first end, a second end, a sidewall, a plant supporting portion, a perimeter gap, a supporting peak, and at least one drain hole. The first end defines a first aperture having a first diameter. The second end is opposite the first end and has a second diameter that is smaller than the first diameter. The sidewall extends between the first end and the second end, and the sidewall continuously tapers from the first end to the second end. The sidewall includes a tapered first length and a tapered second length, the tapered second length is tapered more than the tapered first length. The plant supporting portion is proximate to the second end, but spaced apart from the second end at an interface between the tapered first and second lengths of the sidewall. The plant supporting portion is configured to support a stabilized growth plug within the growing cell spaced apart from the second end and to create a seal between the stabilized growth plug and the sidewall. The perimeter gap is defined between the stabilized growth plug and the sidewall. The perimeter gap is configured to promote uniform growth of a root system by air pruning and to hold liquid retained by the seal. The support peak is defined by a protrusion spaced apart from the second end and configured to further support the stabilized growth plug spaced apart from the second end. There is at least one drain hole configured to allow excess liquid to drain from the second end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
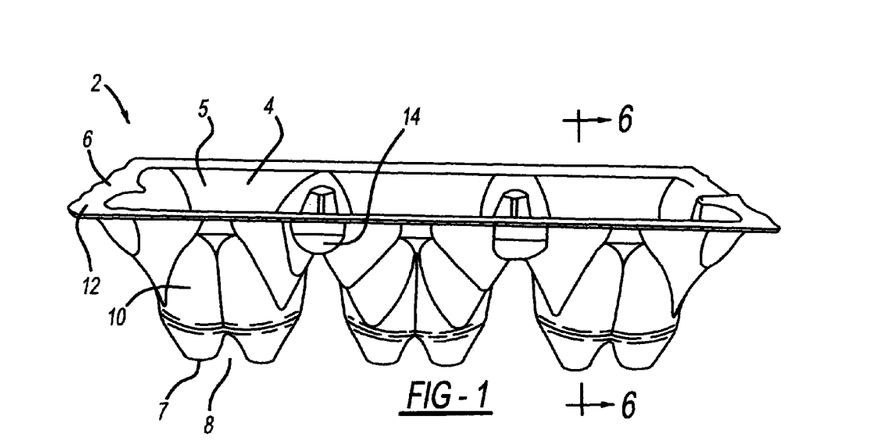
FIG. 1 is a perspective view of the front of a horticulture tray.

With initial reference to FIG. 1, a horticulture tray according to the present teachings is illustrated at reference numeral 2. The horticulture tray 2 is configured for growing and transporting plants grown in stabilized growth plugs, such as the growth plug 16 illustrated in FIG. 5, while preventing root spiraling or girdling, and promoting proper root architecture through air pruning, while also efficiently retaining water. These trays are generally made of a substantially rigid material such as plastic or other polymer and can be formed using methods known in the art such as vacuum thermoforming or injection molding.

The horticulture tray 2 may include one or more growing cells 4. FIG. 1 shows an array with a single row of growing cells 4, though a matrix with a plurality of rows and columns can be provided. When an array or matrix of growing cells 4 are included, the distances between the centers of each growing cell 4 are equal to allow uniform plant growth such that each plant has equal space to develop foliage. The growing cell 4 includes a first aperture 5 defined at a first end 6, a second aperture 7 defined at a second end 8 opposite the first end 6, a sidewall 10, and a top lip 12. When an array or matrix of growing cells 4 are included, an optional configuration allows the sidewalls 10 of adjacent cells to merge below the top lip 12, to form a dam 14. The optional dam 14 retains liquid in an individual growing cell 4, while allowing liquid to flow between cells when the liquid is filled above the dam 14, but below the top lip 12. The optional dam 14 allows for the separate watering of individual growing cells 4 when filled below the dam 14, while allowing for even distribution of water amongst a plurality of cells when filled above the dam. The top lip 12 can be flat with no over-turned edges such that when multiple horticulture trays 2 are arranged adjacent to each other, the top lips 12 may be overlapped. Overlapping of the top lips 12 can prevent water loss from run-off and spills that would otherwise fall between adjacent horticulture trays 2. The top lip 12 is further configured such that when the top lips 12 of adjacent horticulture trays 2 are overlapped, the distance between the centers of the growing cells 4 of the adjacent horticulture tray 2 is equal to the distance between the centers of the growing cells 4 within each individual horticulture tray 2. This configuration allows equal space to each plant for uniform plant growth when multiple horticulture trays 2 are such arranged adjacently.

The second end 8 is more narrow than the first end 6 and the sidewalls 10 of the horticulture tray 2 are continuously tapered from the first end 6 to the second end 8 such that no horizontal surfaces contact the roots of a stabilized growth plug 16 (shown in FIG. 5) when the stabilized growth plug 16 is seated in the growing cell 4. The horticulture tray 2 also includes no surfaces extending perpendicularly from the sidewalls 10 that contact the stabilized growth plug 16, which can advantageously promote proper root architecture which is uniform, structured vertically from the first end 6 to the second end 8 as illustrated at reference numerals 36 and 38 in FIG. 5. An improper root structure (not shown) would include spiraling or girdling roots.

Figure 2:
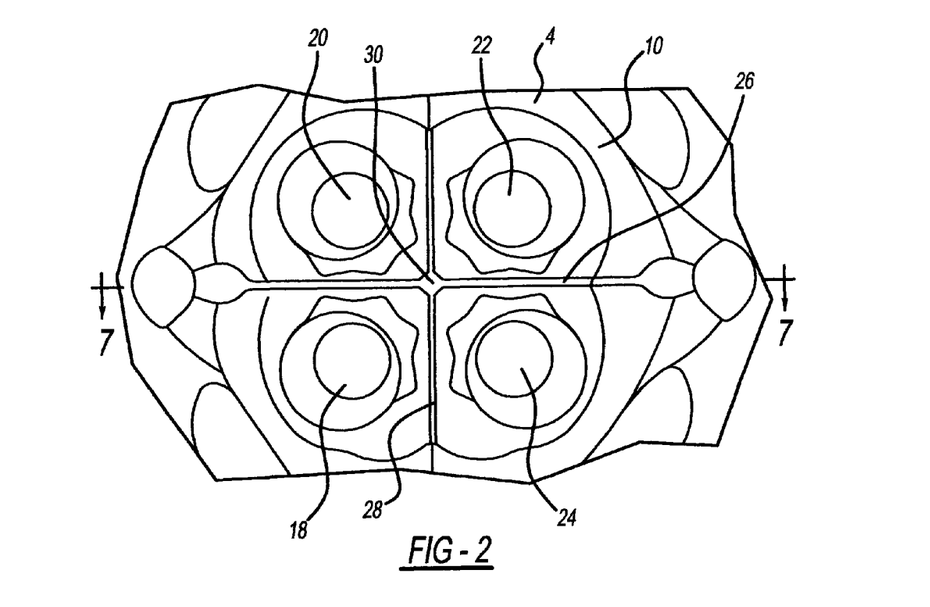
FIG. 2 is a top view of a single growing cell of the horticulture tray of FIG. 1.

FIG. 2 is a top view of a single growing cell 4, looking down from the first end 6 of the growing cell 4. A first drain hole 18 facilitates the draining of excess liquid from the second end 8, while allowing air flow to a bottom end of the stabilized growth plug 16. A second, third and fourth drain hole 20, 22, 24, are also included, but any number of drain holes could be included for the same purpose. A lateral support ridge 26 extends along the second end 8, between the first and second drain holes 18, 20 and between the third and fourth drain holes 22, 24. A longitudinal support ridge 28 extends along the second end 8, between the first and fourth drain holes 18, 24 and between the second and third drain holes 20, 22. The intersection of the lateral support ridge 26 and the longitudinal support ridge 28 forms a support peak 30, which can provide additional support to the stabilized growth plug 16 to support the stabilized growth plug 16 spaced apart from the second end 8. The lateral support ridge 26 and longitudinal support ridge 28 extend from the sidewall 10 at an angle such that neither support ridge is horizontal (see FIG. 7).

Figure 3:
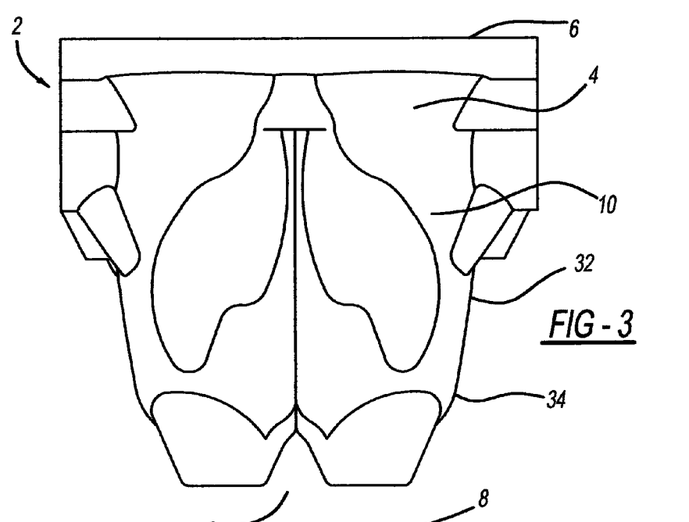
FIG. 3 is a front view of a single growing cell of the horticulture tray of FIG. 1.

FIG. 3 is a front view of a single growing cell 4. The sidewall 10 of the growing cell 4 is continuously tapered from a first diameter at the first end 6 to a second, smaller diameter at the second end 8. The sidewall 10 can comprise a first length 32 and a second length 34. The second length 34 being more tapered than the first length 32.

Figure 4:
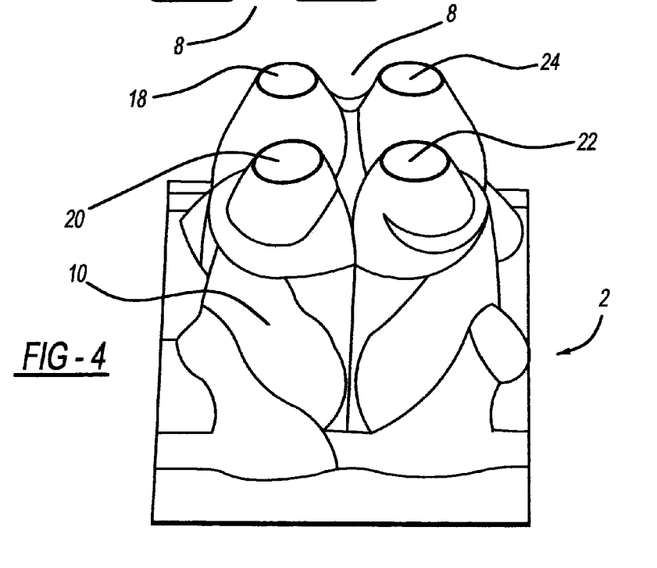
FIG. 4 is a perspective view of the second end of the horticulture tray of FIG. 1.

FIG. 4 is a perspective view of a single growing cell 4 as seen from the second end 8. The first, second, third, and fourth drain holes 18, 20, 22, and 24 are shown.

Figure 5:
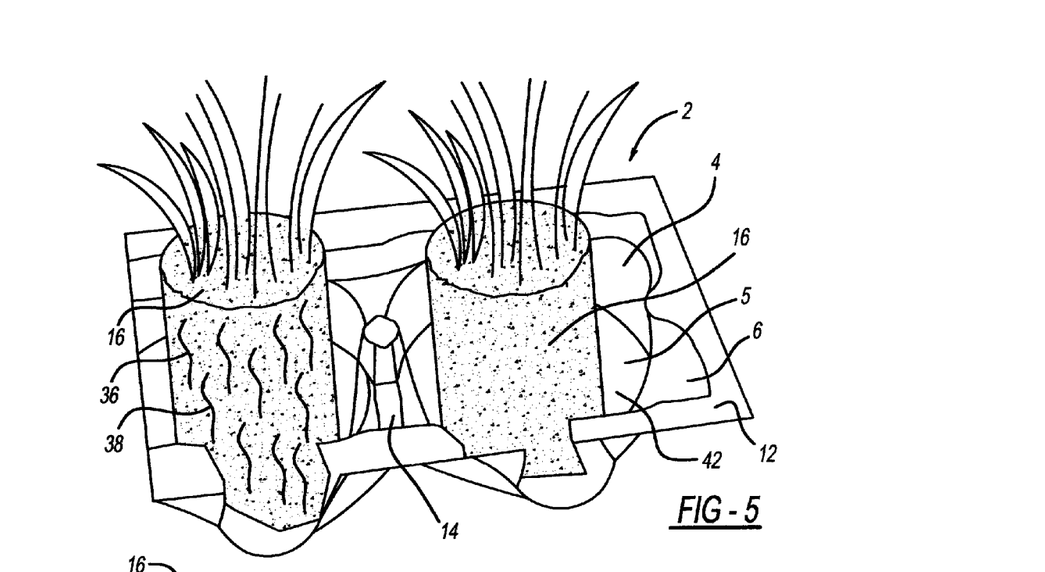
FIG. 5 is a cut-away perspective view of a horticulture tray with stabilized growth plugs.

FIG. 5 is a cut-away perspective view of the horticulture tray 2 showing two growing cells 4 with stabilized growth plugs 16. The stabilized growth plugs 16 are not in contact with the sidewalls 10 of the growing cell 4 along the majority of the stabilized growth plug 16. The lack of contact between the stabilized growth plug 16 and the sidewalls 10 allows air to flow around the stabilized growth plug 16 and promote a proper root system 36 by air pruning. An example of the proper root system 36 is shown with a plurality of uniformly growing roots 38 growing vertically from the first end 6 to the second end 8. An improper root structure (not shown) would include spiraling or girdling roots.

Figure 6:
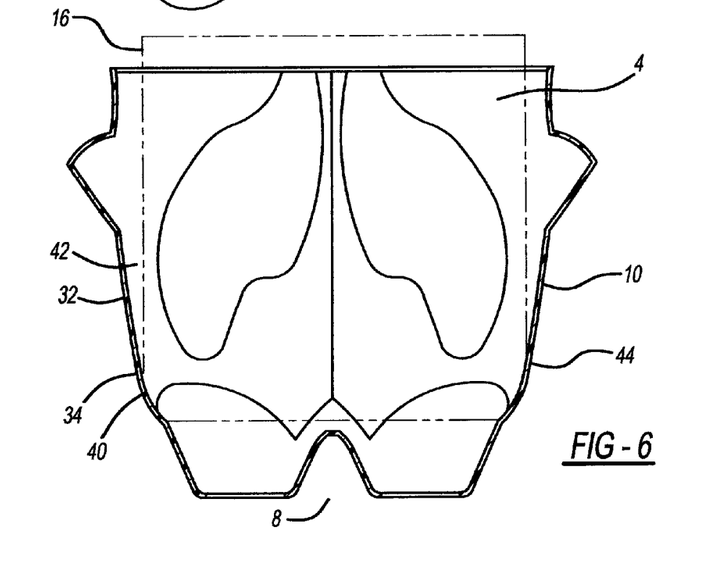
FIG. 6 is a section view of a single growth cell.

FIG. 6 shows a section view of a single growing cell 4 with an outline of the stabilized growth plug 16. The second length 34 forms a plant supporting portion 40, proximate to the second end 8, which supports the stabilized growth plug 16. The stabilized growth plug 16 is supported above and spaced apart from the second end 8, preventing the stabilized growth plug 16 from contacting the bottom of the growing cell 4. The plant supporting portion 40 supports the stabilized growth plug 16 by tapering to a diameter narrower than the diameter of the stabilized growth plug 16, such that the stabilized growth plug 16 rests on, or can be pressed into the diameter of the plant supporting portion 40.

The plant supporting portion 40 further supports the stabilized growth plug 16 such that a perimeter gap 42 is formed between the first length 32 of the sidewall 10 and the stabilized growth plug 16, allowing air to flow around the perimeter of the stabilized growth plug 16. The perimeter gap 42 allows the roots 38 to be air pruned along substantially the entire length of the stabilized growth plug 16, thus promoting proper root architecture. The stabilized growth plug 16 contacts the sidewall 10 where the sidewall 10 becomes more narrow than the stabilized growth plug 16 to form a sealing point 44. The sealing point 44 creates a seal between the stabilized growth plug 16 and the sidewall 10 which allows liquid to collect in the perimeter gap 42.

Figure 7:
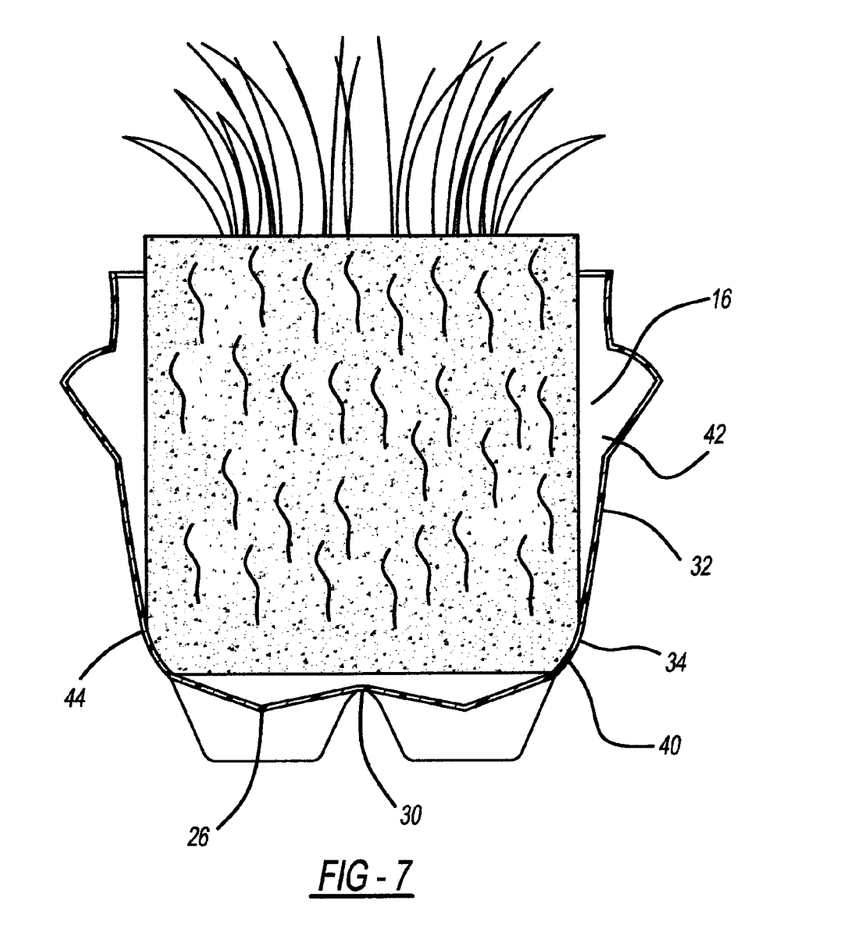
FIG. 7 is another section view of a single growth cell.

FIG. 7 is another section view of a single growth cell. The stabilized growth plug 16 is shown. The lateral support ridge 26 can be seen to not include horizon surfaces and to form the support peak 30 near the center of the growing cell 4.

Figure 8:
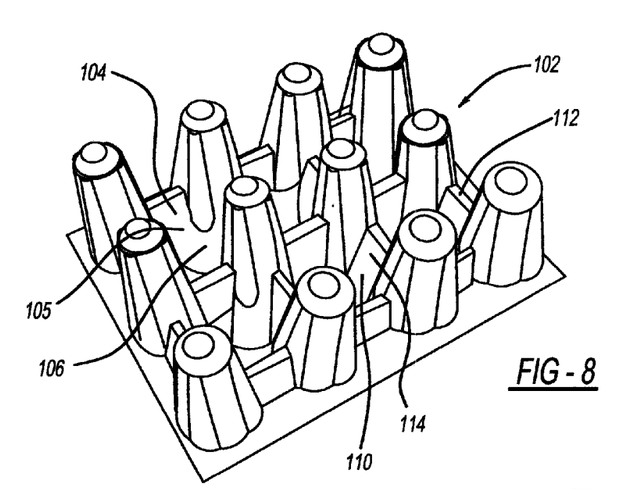
FIG. 8 is a perspective view of another horticulture tray according to the present teachings.

FIG. 8 is a perspective view of another horticulture tray 102 according to the present teachings. The horticulture tray 102 is shown including growing cells 104, a first aperture 105 defined at a first end 6. A sidewall 110 continuously tapers to a second end (not shown) opposite the first end 6. In an optional configuration, the sidewalls 110 of a plurality of growing cells 104 can merge to form a dam 114 which is lower than a top lip 112. The optional dam 114 retains liquid in an individual growing cell 104, while allowing liquid to flow between cells when the liquid is filled above the dam 114, but below the top lip 112.

Figure 9:
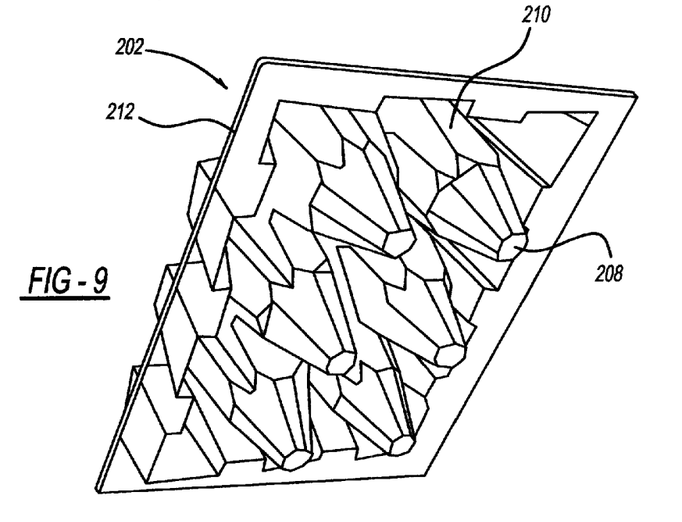
FIG. 9 is a perspective view of another horticulture tray according to the present teachings.

FIG. 9 is a perspective view of another horticulture tray 202 according to the present teachings. The horticulture tray 202 is shown from a second end 208 including a continuously tapered sidewall 210 and a top lip 212.

Figure 10:
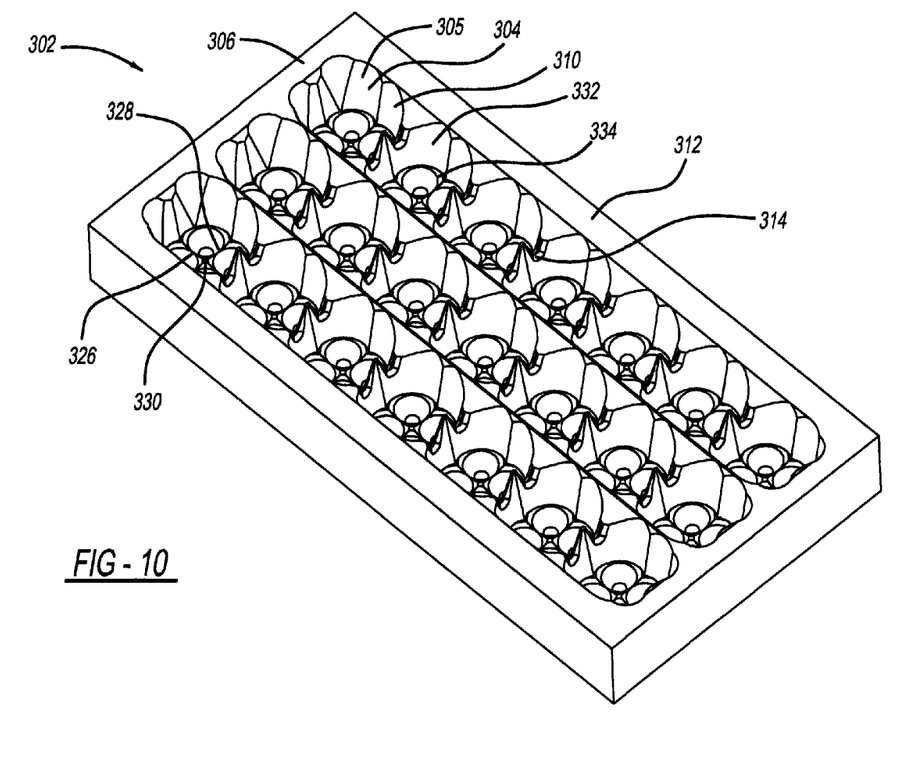
FIG. 10 is a perspective view of yet another horticulture tray according to the present teachings.

FIG. 10 is a perspective view of another horticulture tray 302 according to the present teachings. The horticulture tray 302 is shown from a first end 304 and shown as a matrix of growing cells 304. The growing cells 304 include a first aperture 305 defined at a first end 306, a sidewall 310, and a top lip 312. An optional dam 314 is also shown. A first length 332 and a second length 334 of the sidewall 310 are shown.

Also shown are a lateral support ridge 326, a longitudinal support ridge 328, and a support peak 330.

The horticulture tray of the present teachings advantageously promotes proper root structure. The horticulture tray promotes proper root structure by supporting a plant growing within a stabilized growth plug such that substantially the entire length of the growth plug is exposed to air, resulting in air pruning of the roots. The horticulture tray further promotes proper root structure by including walls that continuously taper from a larger diameter to a smaller diameter without including horizontal surfaces that would contact the stabilized growth plug and cause root spiraling. Additionally the horticulture tray promotes proper root growth by retaining adequate water for growth.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be used only to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. The horticulture tray, comprising:
    a growing cell including:
        a first end defining a first aperture having a first diameter;
        a second end, the second end is opposite to the first end and has a second diameter that is smaller than the first diameter;
        a sidewall extending between the first end and the second end, the sidewall continuously tapers from the first end to the second end, the sidewall includes a tapered first length, a tapered second length, and a plant supporting portion, the tapered second length is tapered more than the tapered first length, the plant supporting portion being proximate to and spaced apart from the second end at an interface between the tapered first and second lengths, the plant supporting portion having a radius that continuously curves from the tapered first length to the tapered second length, the plant supporting portion being configured to support a stabilized growth plug within the growing cell spaced apart from the second end and spaced apart from the tapered first length to define a perimeter gap between the stabilized growth plug and the tapered first length,
    wherein the second end includes a supporting peak, the supporting peak defined by a protrusion spaced apart from the second end and configured to further support the stabilized growth plug spaced apart from the second end.

2. The horticulture tray of Claim 1, wherein the plant supporting portion is further configured to create a seal between the stabilized growth plug and the sidewall, the seal configured to retain liquid in the perimeter gap.

3. The horticulture tray of Claim 1, wherein the growing cell is devoid of horizontal surfaces at the plant supporting portion.

4. The horticulture tray of Claim 1, wherein the growing cell is devoid of surfaces extending perpendicularly from the sidewall at the plant supporting portion.

5. The horticulture tray of Claim 1, wherein the second end defines at least one drain hole, the drain hole configured to allow excess liquid to drain from the second end.

6. The horticulture tray of Claim 1, wherein the horticulture tray includes a plurality of growing cells.

7. The horticulture tray of Claim 6, wherein the sidewall defines a channel that is recessed below a common upper surface of the growing cells, the channel configured to allow fluid communication between a plurality of the growing cells.

8. The horticulture tray of Claim 1, further comprising a stabilized growth plug, the stabilized growth plug having a diameter that is greater than a minimum diameter of the plant supporting portion and less than a maximum diameter of the first tapered length, the stabilized growth plug and the plant supporting portion forming a seal about a perimeter the stabilized growth plug, the stabilized growth plug and the first tapered length defining a perimeter gap disposed between the seal and an upper surface of the growing cells.

9. A horticulture tray, comprising:
    a growing cell including:
        a first end defining a first aperture having a first diameter;
        a second end, the second end is opposite to the first end and has a second diameter that is smaller than the first diameter;
        a sidewall extending between the first end and the second end, the sidewall continuously tapers from the first end to the second end, the sidewall includes a tapered first length, a tapered second length, and a plant supporting portion, the tapered second length is tapered more than the tapered first length, the plant supporting portion being proximate to and spaced apart from the second end at an interface between the tapered first and second lengths, the plant supporting portion having a radius that continuously curves from the tapered first length to the tapered second length, the plant supporting portion being configured to support a stabilized growth plug within the growing cell spaced apart from the second end and spaced apart from the tapered first length to define a perimeter gap between the stabilized growth plug and the tapered first length, p1 wherein:
    the second end includes a supporting peak, the supporting peak defined by a protrusion spaced apart from the second end and configured to further support the stabilized growth plug spaced apart from the second end;
    the horticulture tray includes a plurality of growing cells; and
    the sidewall defines a channel that is recessed below a common upper surface of the growing cells, the channel configured to allow fluid communication between a plurality of the growing cells.

* * * * *